UNITED STATES PATENT OFFICE.

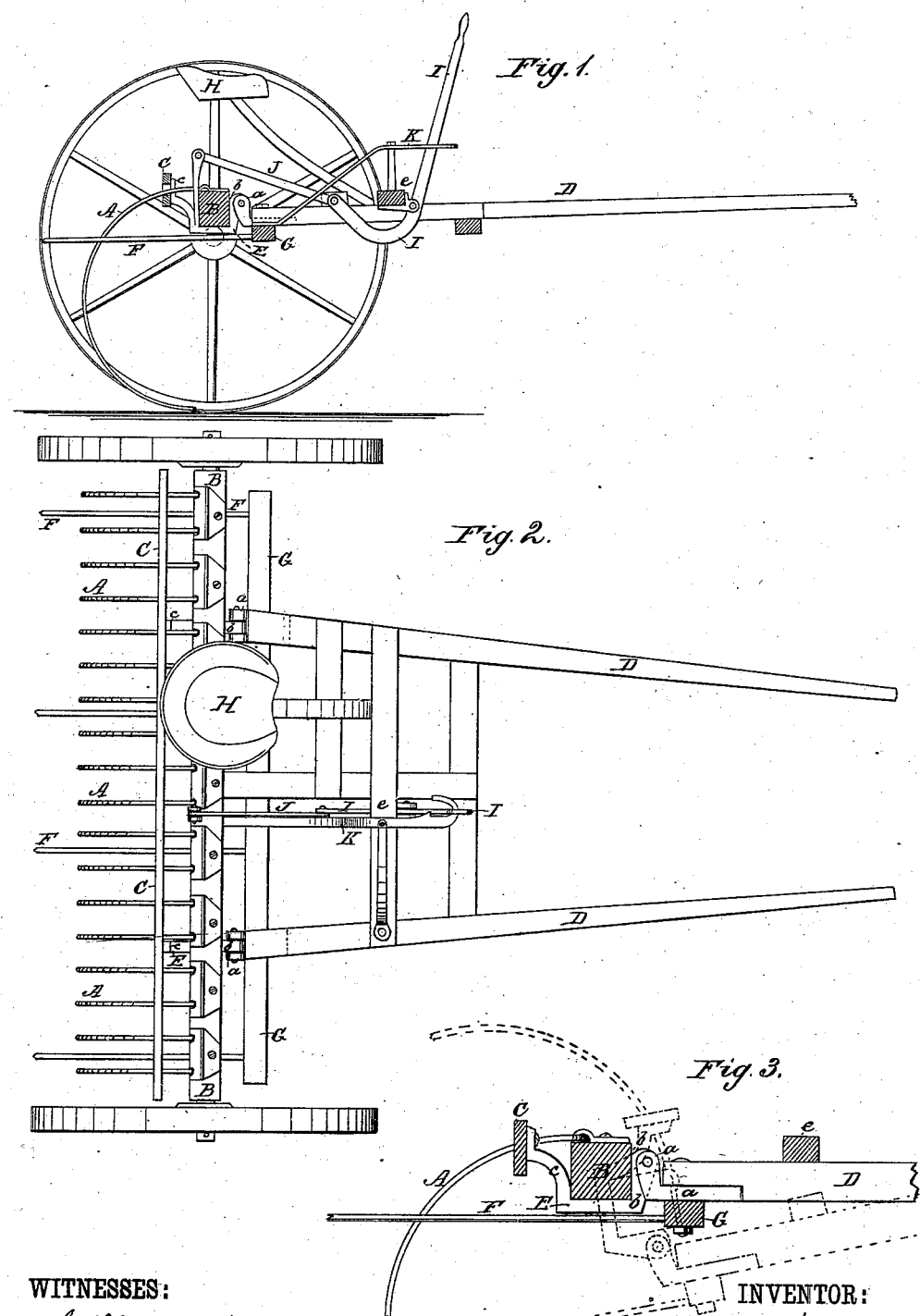

JOHN B. FOGT, OF ANNA, OHIO.

HORSE HAY-RAKE.

SPECIFICATION forming part of Letters Patent No. 224,893, dated February 24, 1880.

Application filed December 1, 1879.

*To all whom it may concern:*

Be it known that I, JOHN B. FOGT, of Anna, in the county of Shelby and State of Ohio, have invented a new and Improved Horse-Rake; and I do hereby declare that the following is a full, clear, and exact description of the same.

My invention is an improvement in that class of riding-rakes in which the wire-teeth are attached to the axle and the driver's seat attached to the hinged thills or shafts, so that upon releasing a locking-lever the rake will be dumped automatically by the weight of the driver.

My invention relates particularly to the form and arrangement of the clip or device by which the shafts and the stay-bar of the wire-teeth are connected with the axle.

In the accompanying drawings, Figure 1 is a vertical section of my improved rake. Fig. 2 is a plan view. Fig. 3 is a detail vertical section, showing also, in dotted lines, the position of the parts in the operation of tilting.

The curved wire teeth A are hinged in pairs on the upper side of the axle B, and pass through slots in the spacing or connecting bar C. The shafts D are hinged by irons $a$ to the front arm, $b$, of clips E, which embrace the lower side of the axle B, and whose rear arms, $c$, are attached to said stay-bar C.

The clearer-teeth F project rearwardly from a bar, G, attached to the under side of the shafts D, and the driver's seat H is supported on the upper side of the shafts and cross-bar.

The means for locking the rake-teeth A in working position, Fig. 1, consist of the curved hand-lever I, connecting-bar J, and notched brace K. Said lever I is pivoted near its lower end to a cross-bar, $e$, of shafts D, and the brace K is supported on the same, and also curved at its front end to adapt it to arrest the lever in its forward throw.

The clips E, to which my invention more particularly relates, serve as a draft-connection between the shafts and axle, and also for supporting the stay-bar C, their rear arms, $c$, being for this latter purpose made longer than the front arms, $b$. This rigid connection of said parts is important and essential to strength, simplicity, and economy of construction of the rake.

The local relation between the point of attachment of the shafts D to the clips E and the journals of the axle is such that when the hand-lever I is thrown out of the notch in brace K the weight of the driver instantly operates to cause the partial revolution of the axle, and thus simultaneously raises the rake-teeth A, depresses the clearers, as shown in Fig. 3, and dumps the load. The draft on the clips also assists in throwing the rake A down again, so that but slight force need be applied to the lever I for that purpose. Said lever I is constructed of steel, and so pivoted that when forced forward it springs into a lateral notch in brace K, and thus locks the rake proper in working position. The lever is thrown out of engagement with the brace K by a light tap or push in a lateral direction.

What I claim is—

1. In a riding horse hay-rake, the combination of the clips E, having front and rear arms, $b$ $c$, with the hinged shafts, the axle, whose journals are located as specified with reference to the shaft-hinges, and the tooth spacing and lifting bar attached to said rear arms of the clips, all as shown and described.

2. The clips E, having front and rear curved arms, $b$ $c$, and an intermediate depression or socket to receive the axle, as specified.

JOHN B. FOGT.

Witnesses:
P. W. YOUNG,
GOTTLIEB GRAW.